United States Patent [19]

Feeman

[11] 4,285,864
[45] Aug. 25, 1981

[54] DISULFONIC PHENYL-AZO-NAPHTHYL-AZO-PHENYL ALKOXY DYES FOR POLYAMIDES

[75] Inventor: James F. Feeman, Wyomissing, Pa.

[73] Assignee: Crompton & Knowles Corporation, New York, N.Y.

[21] Appl. No.: 667,678

[22] Filed: Mar. 17, 1976

Related U.S. Application Data

[63] Continuation-in-part of Ser. No. 80,135, Oct. 12, 1970, abandoned, and Ser. No. 457,828, Apr. 4, 1974, abandoned.

[51] Int. Cl.$^3$ .................... C09B 31/062; D06P 1/39; D06P 3/16; D06P 3/24
[52] U.S. Cl. .................................. 260/191; 260/186; 260/196
[58] Field of Search .......................... 260/191, 186

[56] References Cited

U.S. PATENT DOCUMENTS

| | | | |
|---|---|---|---|
| 3,267,089 | 8/1966 | Feeman | 260/191 |
| 3,676,050 | 7/1972 | James | 8/41 B |
| 3,725,384 | 4/1973 | Zeckendraht et al. | 260/186 |
| 3,951,590 | 4/1976 | Studer | 8/26 |

FOREIGN PATENT DOCUMENTS 480412 12/1969 Switzerland .......................... 260/191

OTHER PUBLICATIONS

Venkataraman, "The Chemistry of Synthetic Dyes", vol. I, pp. 461 to 463, (1952), and vol. II, pp. 1290 to 1292, (1952).

*Primary Examiner*—Floyd D. Higel
*Attorney, Agent, or Firm*—William H. Elliott, Jr.

[57] ABSTRACT

New compounds having the structure:

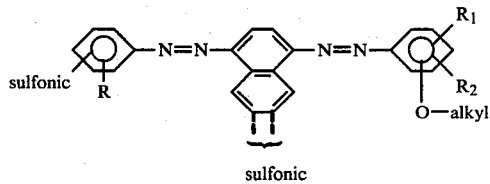

(wherein R represents —H, alkyl, alkoxy or a halogen; $R_1$ represents —H, alkyl, and $R_2$ represents —H, alkyl or alkoxy) are useful as light fast orange dyes for polyamides and they are especially useful as dyes for differential-dyeing nylon carpeting and for wool.

8 Claims, No Drawings

DISULFONIC PHENYL-AZO-NAPHTHYL-AZO-PHENYL ALKOXY DYES FOR POLYAMIDES

This Application is a continuation-in-part of Applications Ser. No. 80,135 filed Oct. 12, 1970 (now abandoned) and Ser. No. 457,828 filed Apr. 4, 1974 (now abandoned).

This invention relates to new compounds that are useful in the dyeing of polyamides such as nylon, silk and wool. They are particularly useful for selectively dyeing the deeper dyeing nylon components of differential-dyeing nylon textiles and reserving the cationic dyeable nylon component even without the use of retarders. As wool dyes, they exhibit excellent light fastness and wash fastness properties and generally improved overall dyeing properties.

The new compounds have the structure:

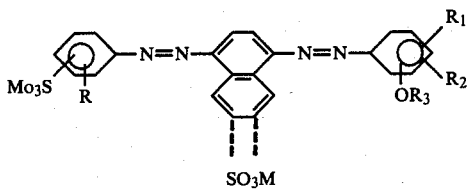

wherein R represents —H, —CH$_3$, —OCH$_3$ or —Cl; R$_1$ represents —H or —CH$_3$; R$_2$ represents —H, 13 CH$_3$ or —OCH$_3$; R$_3$ represents —CH$_3$ or —C$_2$H$_5$ and M represents —H, —Li, —Na, —K or —N(—R$_4$)$_4$ wherein R$_4$ represents —H, —CH$_2$—CH$_2$OH, —CH$_2$CH(OH)CH$_3$ or —CH$_2$CH$_2$OCH$_2$CH$_2$OH and each of the four R$_4$ substituents can at the same time represent the same group or different groups. The —N(—R$_4$)$_4$ group is sometimes hereinafter referred to as an alkanol ammonium group when at least one of the R$_4$ substituents is —CH$_2$CH$_2$OH, —CH$_2$CH$_2$OCH$_2$CH$_2$OH, or —CH$_2$CH(OH)CH$_3$.

These compounds are made by coupling orthanilic acid, metanilic acid, sulfanilic acid, a toluidine monosulfonic acid, an anisidine monosulfonic acid or a chlorometanilic acid to Cleve's 1,6 acid, to Cleve's 1,7 acid or to a mixture of Cleve's 1,6 and 1,7 acids; rediazotizing the monoazo intermediate and coupling to a hydroxybenzene to form a disazo intermediate.

Suitable hydroxybenzenes for producing the diazo intermediates that are useful in accordance with this invention include phenol, cresols, xylenols, methoxyphenols, or methoxycresols.

The disazo intermediate is alkylated with dimethyl sulfate, diethyl sulfate, methyl chloride, ethyl chloride or the like to form compounds capable of imparting orange shades to certain types of polyamide fibers.

The compounds of the invention are usually formed and recovered as the sodium salts of the sulfonic acids. In making the compounds, by appropriate selection of the reagents used in the diazotizations and couplings, they can also be formed and recovered as the Li, K—, —NH$_4$ or alkanol ammonium salts. The isolated salt can be converted to the free sulfonic acid by treatment with an inorganic acid, the free acid can be isolated and recovered in a known manner and thereafter if desired converted to a desired salt such as —Li, —Na, —K or —NH$_4$ by neutralization with a suitable hydroxide, carbonate or ammonia. The free acid can also be converted to alkanol ammonium salts of the sulfonic acids by neutralization with alkanolamines such as mono-, di-, or triethanolamine or mono-, di or triisopropylamine, or di-glycolamine or mixtures thereof. The alkanol ammonium salts have generally greater solubility than the alkali metal salts.

The compounds of this Application are possessed of properties that make them unusually well adapted as dyes for wool and when so used they provide a desirable alternative to the premetallized 1:2 acid dyes. They give brighter shades to wool than are obtained with the premetallized 1:2 dyes. Their light and wash fastness properties on wool are comparable to those of the premetallized 1:2 group and with better resistance to crocking. They are superior in wet fastness to those of structurally similar monosulfonic disazo compounds such as are disclosed in Swiss Pat. No. 480,412, U.S. Pat. No. 3,267,089 and U.S. Pat. No. 3,676,050, in that in washing woolen textiles dyed with the compound of this invention do not cross-stain onto acetate, nylon, polyester or acrylic fibers, whereas wet treatments of woolens dyed with the aforementioned monosulfonic azo compounds cross-stain nylon and polyester fibers to an objectionable degree, and also have a tendency to cross-stain other fibers.

Unlike many acid dyes which must be applied to wool from strongly acid dye baths (e.g. pH 1-2) especially where heavy shades are desired, the compounds of this invention can be applied with excellence with build-up to heavy shades at the iso-electric point of the wool substrate (i.e. a pH of 4 to 4.5). This minimizes fiber degradation and maintains desirable characteristics of the wool during the dyeing operation. Further, because of the characteristics and working properties of the compounds of this application, wool can be dyed therewith at any of the various manufacturing stages from the yarn to the finished textile.

The dyes of this invention can be used in trichomy dyeing systems for wool and it, in combination with C.I. Acid Blue 113, produces fast black shades with outstanding fastness to crocking.

The new compounds are also useful as light fast orange dyes that will selectively dye certain types of nylon fiber while reserving other types of nylon fibers even without the use of retarding agents. For this reason they are uniquely valuable as dyes for differential dyeing nylon carpeting that is usually made up of combinations of two or three different types of nylon fiber and sometimes as many as four or five nylon fiber components—each having different dye affinity—i.e., combinations of cationic dyeable nylon, light dyeing nylon, regular nylon, deep dyeing nylon fibers and occasionally ultra deep dyeing nylon fibers; the usual combination being cationic dyeable nylon, regular nylon and deep-dyeing nylon.

Most of the acid dyes that are used commercially as dyes for regular nylon fibers will also dye deep-dyeing nylon and ultra deep-dyeing nylons; they heavily stain light dyeing nylons and they stain cationic dyeable nylon to varying degrees ranging from light to medium staining. This is true of the dyeing characteristics of the somewhat similarly structured monosulfonic disazo dyes of U.S. Pat. Nos. 3,267,089 and 3,676,035 and Swiss Patent No. 480,412. In connection with the dyes of U.S. Pat. No. 3,267,089 and Swiss Patent No. 480,412, it should also be observed that it is necessary to use 1-naphthylamine as an intermediate in the making of the compounds. Federal authorities have declared 1- naphthylamine to be a hazardous substance with carcinogenic potential, and have placed very severe restrictions on its use. The compounds of this invention are prepared from Cleve's 1,6-, Cleve's 1,7- or Mixed Cleve's 1,6- and 1,7- acids—i.e., naphthyl compounds that are not proscribed and that can be prepared from naphthalene without using or producing 1-naphthylamine.

Furthermore, in the dyeing of differential-dyeing nylon carpeting, it is customary to apply a basic dye that can dye the cationic dyeable nylon in a contrasting color from the same dye bath that contains the acid dye, and therefore the ability of the acid dye component to be selectively specific (for example, the ability to specifically dye certain of the nylon fiber components and reserve or only minimally stain certain other nylon fiber components) is a highly desired attribute. Not all acid nylon dyes have this capability. Thus, the ability of an acid dye to dye the deep-dyeing nylon component while reserving the cationic dyeable nylon component enables purer, brighter colors to be developed on both the deep-dyeing nylon component by the acid dye and on the cationic dyeable nylon component by the basic dye. Similarly, the ability of the acid dye to dye the deep-dyeing nylon component while reserving as much as possible or significantly minimizing the staining of the light dyeing nylon component enables the development of purer and brighter colors on the light dyeing nylon component. This property of fiber selectivity, therefore, provides for maximum color contrast and control of depth of color between the various fiber components.

While the compounds of this invention are applied to a differential dyeing nylon carpeting, the dye can be used to produce striking color contrasts between the different fiber types of a given composite by controlling the pH at which the dye is applied. At close to neutral pH (e.g., about 6-7.5) the new compounds will completely reserve the cationic dyeable nylon component, and this is accomplished even without the addition of retarding agents. They will lightly dye (or heavily stain) the regular nylon component and will dye the deep-dyeing nylon component in a clear bright orange hue. If the pH of the bath is raised, for example to above about 8, both the cationic dyeable nylon and the light dyeing nylon can be fully reserved and the staining of the regular nylon significantly reduced. Thus, by controlling the pH during the dyeing cycle it is possible to further enhance the contrast possibilities in composite textiles that contain cationic dyeable nylon and/or light dyeing nylon with one or more of the heavier dyeable nylons.

The new dyes of this invention are also compatible with many of the basic, modified basic and disperse dyes that can be used to color the nylon components that are reserved in the presence of the new dyes, and they can be applied simultaneously from the same bath with dyes of other types to give a wide range of color and contrast variants.

In addition, the new compounds are compatible with many acid dyes of various other colors that have very similar affinity, migration and exhaustion characteristics for the polyamides and which can be applied simultaneously from a common aqueous bath and when so used form a compound color. For use in such applications, it is important that both acid dyes strike at about the same rate so they will neither block nor be blocked by one another, and transfer on tone, thus enabling the obtaining of better reproducibility of composite hues. (Blocking is a well recognized phenomenon that occurs when a fiber is dyed with a mixture of colors of the same general classification but which, because of differing fiber affinities, migration rates and exhaustion characteristics, are incompatible with one another. When a dye mixture containing an incompatible dye is applied from a common dye bath to impart a desired hue to the fabric, the dye that has the greater affinity for the dye sites reacts preferentially to block the dye sites and cannot be displaced by a dye of lower affinity. In other words, the blocking of the dye sites leads to exclusion of the dye with lower affinity and causes undesired color variation in the dyed fabric.)

For use in polychromic dyeing systems, the dyes of this invention are compatible with, and exhibit substantially the same fiber affinity, migration and exhaustion characteristics for the various types of nylon textile fibers as the dyes for differential dyeing nylon textiles disclosed in Belgian Patent No. 773,811; Belgian Patent No. 773,810; Belgian Pat. No. 773,809; U.S. Pat. No. 3,813,402, and U.S. Pat. No. 3,932,376.

When a dye of this invention is used in an aqueous dye bath together with one or more of the foregoing dyes to form a compound color, it exhausts on tone throughout the dyeing cycle, i.e. the dye components exhaust uniformly under neutral to mildly alkaline conditions onto the various nylons colored thereby without blocking one another and therefore reproducible compound colors are readily obtainable.

The following example will serve to illustrate the preparation and use of the dyes of this invention. In this example, parts and percentages are by weight and temperatures are in degrees Centigrade, unless otherwise stated.

EXAMPLE 1

Sulfanilic acid (173 parts) was dissolved at pH 8 in 600 parts of water. In this solution was dissolved 70 parts of sodium nitrite and the solution was poured into a mixture of 290 parts of concentrated hydrochloric acid and sufficient ice to maintain the diazotization temperature at about 0 degrees. The mixture was stirred at 0 degrees for 10 minutes. A slight excess of nitrous acid was removed by adding sulfamic acid solution.

While maintaining the temperature at 0 degrees, 46 parts of sodium bicarbonate was sifted in with good stirring to raise the pH to about 5.

Meanwhile, 250 parts of Cleve's 1,6 acid was dissolved in 500 parts of water at 45 degrees by the addition of 50% sodium hydroxide solution (about 80 parts). This solution was added to the diazonium salt slurry while simultaneously adding ice to keep the temperature at 0 degrees. After two hours the coupling was complete. The pH was raised from about 3 to 11 with about 75 parts of 50% sodium hydroxide. To the resultant solution was added 75 parts of sodium nitrite, ice to 0 degrees and 350 parts of concentrated hydrochloric acid.

After one hour's stirring, excess nitrous acid was decomposed by addition of sulfamic acid, and 110 parts of 85% phenol was added followed by 100 parts of sodium carbonate and ice to keep the temperature below 5 degrees. Coupling was complete after one hour. The solution was heated to 90 degrees, and pH raised to about 12 with sodium hydroxide solution, and maintained there while adding about 600 parts of diethylsulfate. Upon cooling to about 20 degrees and filtering, an orange, crystalline solid was obtained as the sodium salt which was dried.

The new dye has the structure:

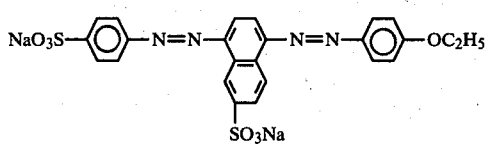

It is a water soluble compound that dyes polyamide fibers such as wool and nylon 66 in light-fast orange shades.

In the foregoing example, while otherwise proceeding as described, similar dyes may be prepared by replacing the sulfanilic acid with e.g. orthanilic acid, metanilic acid, 4-chlorometanilic acid, 6-chlorometanilic acid, o-toluidine-m-sulfonic acid, o-anisidine sulfonic acid, p-toluidine-m-sulfonic acid, or p-anisidine sulfonic acid.

Also, in the above example while otherwise proceeding as described, similar dyes may be prepared by replacing the Cleve's 1,6 acid with Cleve's 1,7 acid or with mixed Cleve's 1,6 and 1,7 acids, or by replacing phenol with o-cresol, m-cresol, p-cresol, a xylenol, a methoxyphenol or a methoxycresol.

Use of dimethylsulfate in place of diethylsulfate in the above example will give the corresponding methyl ester.

From the standpoint of simplicity of synthesis, it is preferred that the $-OR_3$ group be positioned ortho or para to the azo linkage.

EXAMPLE 2

A dye bath was prepared to provide 0.25% (o.w.f.) the dye of Example 1, 2% levelling and pH control agent (Cenegen MDA) and 3% monosodium phosphate. The pH of the bath was about 6.2. A woven multifiber fabric tape having 1" wide strips of four different types of nylon (E. I. DuPont designations) i.e.:

Strip A is Type 844 nylon (cationic dyeable)
  Strip B is Type 845 nylon (light dyeing)
  Strip C is Type 846 nylon (regular)
  Strip D is Type 847 nylon (deep dyeing)

was immersed in the bath, the temperature was raised to 212 degrees F. at 2 degrees per minute and dyed for 60 minutes. The multifiber samples were removed from the dye bath, rinsed and dried.

The cationic dyeable nylon (Strip A) was fully reserved. The light dyeing nylon (Strip B) was very lightly stained with color. The regular nylon (Strip C) was very lightly dyed in a pale orange hue and the deep dyeing nylon (Strip D) was dyed in a clear, bright orange.

By increasing the pH of the dye bath to the mildly alkaline side, the light nylon can also be substantially completely reserved.

EXAMPLE 3

A dye bath was prepared to provide (o.w.f.):
  Acetic acid: 2%
  Glauber's Salt: 10%
  Dye of Example 1: 2%

A wool gabardine was entered in the dye bath at room temperature, the bath was raised to the boil over a 30-minute period and held at the boil for 60 minutes. The dyed fabric was cooled, removed from the bath, rinsed and dried. The fabric was dyed in a light fast orange shade.

A test specimen cut from the dyed fabric was subjected to a standard wash fastness test—AATCC method 36-1972 (Test #2)—in a Launder-Ometer for 30 minutes at 120 degrees F. together with a multifiber fabric consisting of strips of acetate, cotton, nylon, polyester, acrylic and wool fibers, with the following results:

|  | Rating |
| --- | --- |
| Alteration | 5 |
| Stain |  |
|   Acetate | 5 |
|   Cotton | 4 |
|   Nylon | 5 |
|   Polyester | 5 |
|   Acrylic | 5 |
|   Wool | 5 |

The number values are the usual AATCC ratings running from 5 to 1 in which 5 represents no or negligible change and 4 represents a slight change, etc.

EXAMPLE 4

A dye bath was prepared to provide (o.w.f.):
  Orange dye of Example 1 (supra): 0.25%
  Blue dye (Example 1—U.S. Pat. No. 3,813,402): 0.25%
  Levelling and pH control agent (Cenegen MDA): 2.0%
  Monosodium phosphate: 3.0 %

The pH of the bath was about 6.3.

Six lengths of a woven nylon multifiber fabric tape of the type employed in Example 2 were each placed in a dye beaker containing dye liquor that had been heated to about 125 degrees F. As heating was continued the fabrics in the baths were subjected to constant agitation. At various predetermined times during the dyeing cycle (i.e. when the bath reached 170 degrees F., 190 degrees F., 212 degrees F., 10 minutes after reaching 212 degrees F. and 30 minutes after reaching 212 degrees F.) one of the multifiber pieces was removed from its dyebath, rinsed and dried. At the completion of the dyeing cycle (i.e. 30 minutes after the bath had reached 212 degrees F.), 3% o.w.f. of acetic acid was added to the sixth dyebath to drop the pH to about 3.5 and the dye in the dyebath was completely exhausted from the acid bath on the remaining piece of the multifiber by maintaining the bath at 212 degrees F. for still another 30-minute period. The last multifiber sample was then removed from its dyebath, rinsed and dried.

The blue and orange dyes combination was adapted to impart to differential dyeing nylon carpet fibers having the four nylon components present in the multifiber, the following color at the end of the dyeing cycle:—a dark olive green hue to the deep dyeing nylon fibers, a light olive green to the regular dyeing nylon fibers, a pale olive green to the light dyeing nylon fibers and reserve the basic dyeable nylon fibers.

Strips B, C and D of the multifiber samples first two removed from the dye bath (i.e. at 170 degrees and 190 degrees F.) exhibited a slight bluish tinge in the color imparted thereto on the initial strike of the dye indicating that the blue dye was striking at a slightly faster rate than the orange dye. After the dye bath had reached 190 degrees F. and to the end of the dyeing cycle the color developed on each of Strips B, C and D built up on tone on each fiber type as the dyeing progressed and also maintained an on-tone differential between the different fiber types at each point of time during the dyeing cycle when the multifiber swatches were removed. This indicates the high degree of compatibility of the dyes and the absence of blocking by either dye.

This example provides a simple test for determining the compatibility of the dyes of this invention with other acid dyes (as to fiber affinity, migration and exhaustion characteristics) to enable their use in polychromic systems for the dyeing of differential dyeing nylon carpeting.

I claim:

1. A compound having the structure:

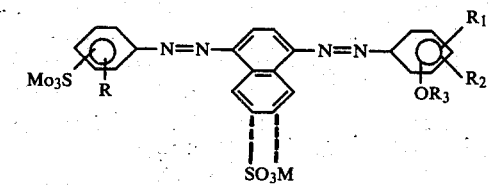

wherein R represents —H, —CH$_3$ or —Cl; R$_1$ represents —H or —CH$_3$; R$_2$ represents —H, —CH$_3$ or —OCH$_3$; R$_3$ represents —CH$_3$ or —C$_2$H$_5$ and M represents —H, —Li, —Na, —K or —N—(R$_4$)$_4$ wherein R$_4$ rerepresents the same substituent or different substituents selected from the following: —H, —CH$_2$—CH$_2$OH, —CH$_2$CH(OH)CH$_3$ or —CH CH$_2$OCH$_2$CH$_2$OH.

2. A compound according to claim 1 where —OR$_3$ is ortho or para to the azo linkage.

3. A compound according to claim 1 wherein R$_3$ is —C$_2$H$_5$.

4. A compound according to claim 2 wherein R$_3$ is —C$_2$H$_5$.

5. A compound according to claim 1 wherein the —SO$_3$M group on the terminal benzene ring is positioned para to the azo linkage.

6. A compound according to claim 2 wherein the —SO$_3$M group on the terminal benzene ring is positioned para to the azo linkage.

7. A compound according to claim 3 wherein the —SO$_3$M group on the terminal benzene ring is positioned para to the azo linkage.

8. A compound according to claim 4 wherein the —SO$_3$M group on the terminal benzene ring is positioned para to the azo linkage.

* * * * *